UNITED STATES PATENT OFFICE.

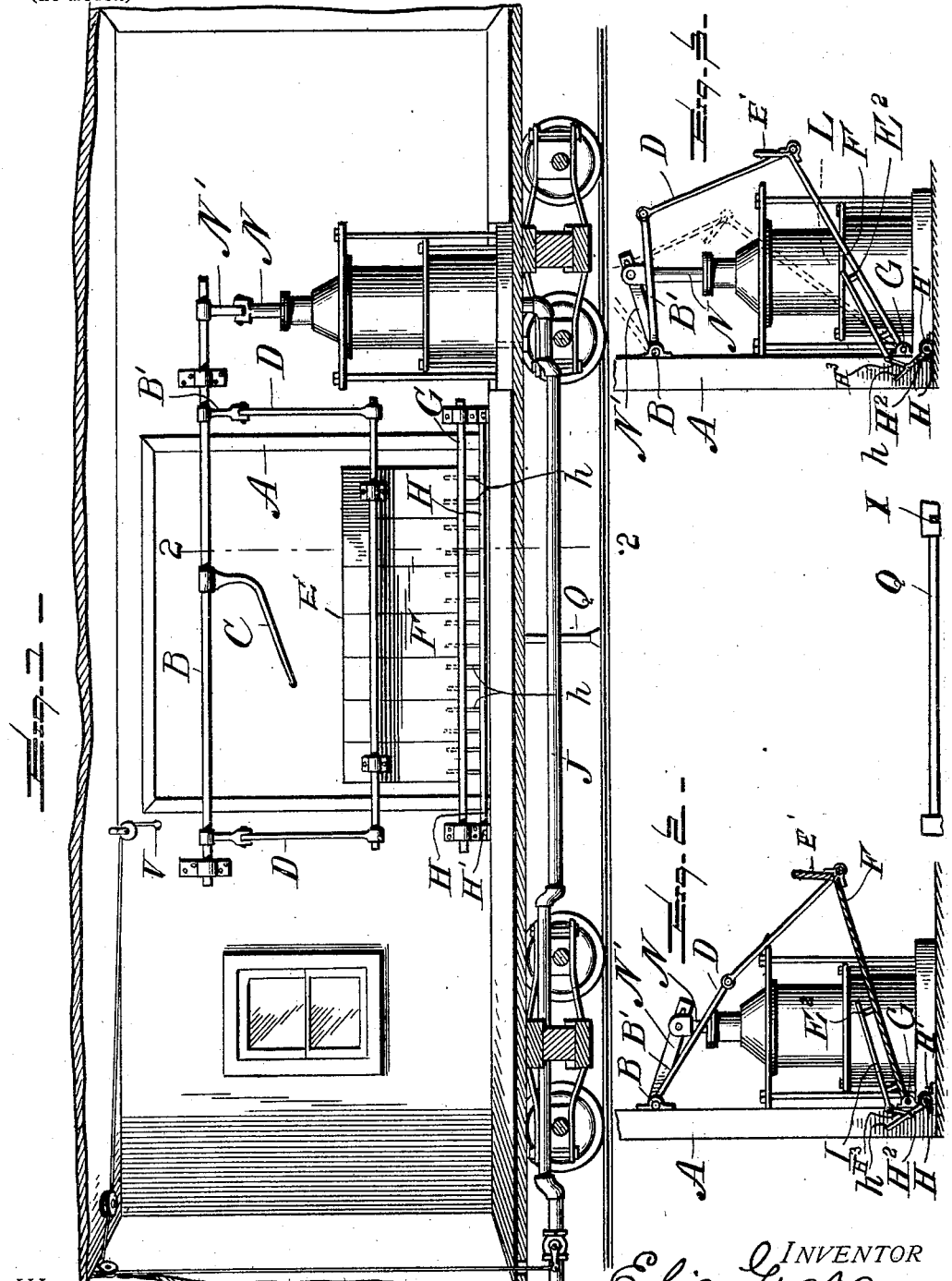

ELIAS GRAHAM, OF HAZELDELL, ILLINOIS, ASSIGNOR OF TWO-THIRDS TO SAMUEL McBRIDE, OF SAME PLACE, AND OWEN C. FUQUA, OF CASEY, ILLINOIS.

MAIL-BAG-DELIVERY APPARATUS.

SPECIFICATION forming part of Letters Patent No. 682,930, dated September 17, 1901.

Application filed June 28, 1901. Serial No. 66,397. (No model.)

*To all whom it may concern:*

Be it known that I, ELIAS GRAHAM, a citizen of the United States, residing at Hazeldell, in the county of Cumberland and State of Illinois, have invented certain new and useful Improvements in Mail-Bag-Delivery Apparatus; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in mail-bag delivery and receiving apparatus which is adapted to be fastened to a car adjacent to the door thereof; and it consists in the provision of means for pneumatically delivering mail and taking the same in while the car is in motion.

The invention will be hereinafter more fully described and then specifically defined in the appended claims, and is clearly illustrated in the accompanying drawings, which, with the letters of reference marked thereon, form part of this application, and in which—

Figure 1 is a perspective view of my improved apparatus shown as applied to the door of a car; and Fig. 2 is a cross-sectional view on line 2 2 of Fig. 1, parts shown in elevation. Fig. 3 is a detail in elevation of the means for throwing the mail.

Reference now being had to the details of the drawings by letter, A designates the car-door opening, which has mounted in suitable boxings on the frame thereof a shaft B, having arms B' projecting therefrom.

Mounted in bearings near the bottom of the door-opening on the frame thereof is a shaft G, to which is fastened the mail trap or platform F, the inner end of which is angled. The inner end of said trap or platform F has projecting ends E', to which are pivoted the rods or links D, which in turn are pivoted at their upper ends to the ends of the arms B'.

Journaled in bearings H', which are mounted, preferably, on the outer face of the car and underneath the threshold, is a shaft H, having an arm $H^2$ thereon, which is pivoted to the bar I by means of a link $H^3$, which bar I in turn is pivoted to an arm $E^2$, which is either integral with or fastened to said trap F. Mounted on the shaft H at suitable intervals are fingers $h$, which are disposed in an upright position when the rack and mail trap or platform are at their lowest limit, in which position said fingers serve to hold the mail bag or bags upon said trap or platform. As the trap or platform is hoisted said fingers will turn outward and into substantially horizontal or downwardly-inclined positions.

Mounted within the car, at any suitable location adjacent to the door, is a pneumatic cylinder having a piston L mounted therein. The stem N of said piston is pivotally connected to an arm N', which is fastened to or integral with the projecting end of the shaft B. Connecting said pneumatic cylinder with the air-pump in the locomotive (not shown) is a pipe J, and V represents a handle mounted on the end of a rope which passes to the air-pump, which is located, preferably, in the cab of the engine and connected to the valve regulating the supply of air to said cylinder.

Projecting from the shaft B is a receiving-arm C, which when the frame carrying the mail trap or platform is thrown to an upright position projects outward and is adapted to receive a mail-bag which has been previously mounted upon a crane adjacent to the passing car.

At the location of delivery of the mail it is my purpose to erect a back-stop Q, which is located on the ground at right angles to the length of the car, and in order to prevent the bags of mail from falling or being drawn underneath the car I construct guard-fences X at right angles to said back-stop and adjacent to the car-track. This back-stop and guard-fences are made, preferably, of wire, so as to yield slightly under the impact of the bags as they are thrown against the same.

In operation the bag or bags of mail are laid upon the trap or platform when the same is down at its lowest limit. When it is desired to throw the bags out at a mail-station, the operator merely draws upon the handle, which is connected to the rope which actuates the lever in the air-pump, thus allowing the pressure of the air to drive the piston L upward and in so doing impart a rotary motion to the shaft B, which will cause the trap carrying the mail to be raised to its highest limit by reason of its connections with the arms on said shaft. As it is raised to a vertical position the bag will be thrown out by the force of the upward swinging movement of said trap or platform and the receiving-arm will project out in position to receive the mail-bag which has been previously placed upon a crane.

By this apparatus I am able to furnish a means to exchange the mail from and to moving trains to lessen the danger of damage to the mail and its attendants and save labor in handling the same.

Having thus described my invention, what I claim to be new, and desire to secure by Letters Patent, is—

1. A mail-bag-delivery apparatus, comprising in combination with the car, a swinging rack or frame, a trap mounted thereon to receive said mail-bag, pneumatic means for raising said frame to a vertical position to deliver the mail, and means for holding the mail-bags on said platform as the latter is raised, as set forth.

2. A mail-delivery apparatus, comprising in combination with the car, a rack hinged adjacent to the door-opening thereof, a platform or trap secured to said frame, pneumatic means for raising said frame to throw the mail out, a guard-shaft journaled to the car, a series of fingers mounted on said shaft adjacent to the platform, and pivotal connections between the arm on said shaft and frame, whereby as the frame is raised to an upright position, said guard-fingers are hung down into horizontal positions, as set forth.

3. A mail-delivery apparatus, comprising in combination with the car, a frame having a shaft which is journaled adjacent to the door-opening, a guard-shaft journaled in suitable bearings on the car, fingers on said shaft, which are upwardly disposed when said frame is at its lowest limit, arms on said frame, and guard-shaft and a link or bar pivotally connecting said arms, a shaft with mail-receiving arm and pivotal link connections between said frame and the shaft carrying the mail-receiving arm, as set forth.

4. In combination with the car, a rack hinged at its lower end adjacent to the opening of the car, the guard shaft and fingers mounted thereon, pivotal connections between said guard shaft and frame, the mail-receiving arm and shaft carrying the same, which is journaled in suitable bearings on the car, pivotal link connections between the arms on said shaft carrying the mail-receiving arm, and a pneumatic piston having pivotal connections with an arm mounted on or integral with the shaft carrying the mail-receiving arm, and means for actuating said piston whereby the shaft is rotated, and the frame carrying the mail is raised to an upright position.

In testimony whereof I hereunto affix my signature in presence of two witnesses.

ELIAS GRAHAM.

Witnesses:
FRANK SANFORD,
MORT. STURTS.